United States Patent [19]

Hayamizu et al.

[11] 4,136,949
[45] Jan. 30, 1979

[54] METHOD FOR OPTICALLY MEASURING A DISTANCE

[75] Inventors: Mamoru Hayamizu; Yasushi Tanigaki, both of Tokyo, Japan

[73] Assignee: Kabushiki Kaisha Daini Seikosha, Japan

[21] Appl. No.: 754,524

[22] Filed: Dec. 27, 1976

[30] Foreign Application Priority Data

Dec. 26, 1975 [JP] Japan .................................. 50-157580
Jan. 19, 1976 [JP] Japan .................................. 51-4743

[51] Int. Cl.$^2$ .......................... G01C 3/00; G01C 3/08
[52] U.S. Cl. ........................................ 356/1; 250/560; 356/4
[58] Field of Search .................... 356/1, 4, 141, 152, 356/156, 159, 108; 250/560

[56] References Cited

U.S. PATENT DOCUMENTS

| | | | |
|---|---|---|---|
| 3,217,592 | 11/1965 | Braun et al. | 356/1 |
| 3,554,646 | 1/1971 | Carlson | 356/4 |
| 3,565,531 | 2/1971 | Kane et al. | 250/560 |
| 3,671,726 | 6/1972 | Kerr | 356/156 |
| 3,692,414 | 9/1972 | Hosterman et al. | 356/4 |
| 3,802,774 | 4/1974 | Eschler et al. | 356/1 |
| 3,856,399 | 12/1974 | Hosoe et al. | 356/1 |
| 3,923,395 | 12/1975 | Bodlaj | 356/1 |

Primary Examiner—S. C. Buczinski
Attorney, Agent, or Firm—Robert E. Burns; Emmanuel J. Lobato; Bruce L. Adams

[57] ABSTRACT

A beam of light from a light source is reflected by a polyhedral mirror which is continuously rotating in a constant speed around its axis. The reflected beam sweeps on an object and passes a predetermined point of the object surface. A dispersed light from the point is formed into a beam through a set of slits and reaches a light detector.

The polyhedral mirror has a plurality of mirror surfaces each of which is spaced at a distance from the rotary axis thereof, different from the adjacent mirrors.

A pair of targets are arranged in the beam axis to the light detector. Dispersed light beams from both upper and lower targets also reach into the light detector.

The distance between a point of the object and the beam line from the light source is computed from the distances of the mirror surfaces from the rotary axis of the polyhedral mirror, the distance between the upper and lower targets and the inclination angles of the mirror surfaces from the beam line, and the angles of the reflected beam hitting the predetermined point or the targets.

5 Claims, 5 Drawing Figures

METHOD FOR OPTICALLY MEASURING A DISTANCE

BACKGROUND OF THE INVENTION

This invention is concerned with a method for optically measuring a distance about three dimentioned objects, and more particularly with a precise and continuous thickness measuring method of steel strip using a light beam.

Conventional methods of this kind have very precise accuracy such as method using light interference, a method using holography, a method using more image interference fringes and others. But these methods are available for laboratory use but not suitable for on-line use in a plant.

In these optical geometry measuring methods, the optical measuring method of triangulation is most suitable for on-line use. The measuring theory of the triangulation will first be described for better understanding of the invention referring to FIG. 1, in which a laser beam A is projected on a base line 1 toward a mirror 2 from which the reflected beam B is irradiated on an object 3 making a spot P on the object. Spot P is detected by a photo-detector 4 by way of a detecting optical axis 7 defined by a pair of slits 5 and 6. The distance M between spot P and base line 1 can be calculated with the distance l between the intersecting point $Q_1$ of detecting optical axis 7 to base line 1 and the reflecting point $Q_2$ of laser beam A at mirror 2, the intersecting angle $\varphi_1$ of detecting optical axis 7 to base line 1, and the intersecting angle $\varphi_2$ of reflecting light line 6 to laser beam A, if they are known. In a practical method, mirror 2 is fixed so that angle $\varphi_2$ has a constant value and, moving the set of photo-detector 4 and slits 5 and 6 parallel to base line 1, keeping angle $\varphi_1$ constant, distance l is determined with the displacement of the set until photo-detector 4 detects spot P, whereby the distance M is calculated. In another practical method, the set of photo-detector 4 and slits 5 and 6 is fixed to keep angle $\varphi_1$ constant and mirror 2 rotates to sweep the reflected light beam B on object 3. In this method, the distance M can be calculated using angle $\varphi_1$, angle $\varphi_2$ which is equal to $2\varphi_3$ ($\varphi_3$ is the rotating angle of mirror 2 referred to base line 1 when spot P is detected by photo-detector 4), and distance $l = d_2 - d_1 \times \sec \varphi_3 + d_3 \tan \varphi_3$, $d_1$ indicating the distance between the rotating axis of mirror 2 and the mirror surface, $d_2$ indicating the distance between the rotating axis and intersecting point $Q_1$ and $d_3$ indicating the distance between the rotating axis and base line 1.

In this latter method, high accurate measurement of e.g., 2μm unit requires very stable values in distances $d_1$, $d_2$ and $d_3$ and in angle $\varphi_1$ with high precision measurement of rotating angle $\varphi_3$ of the mirror. Distance $d_1$ is rather stable but $d_2$, $d_3$ and $\varphi_1$ are strictly unstable due to their thermal displacements. Particularly in measurement of profile of the object continuously moving the mirror and the photo detector along the base line, it becomes extremely difficult to keep $d_3$ and $\varphi_1$ just constant. $\varphi_1$ and $d_3$ should in fact be treated as variables. There is a similar problem in the former conventional method, in which distance l and angle $\varphi_1$ are also variables due to error in the photo-detector movement.

SUMMARY OF THE INVENTION

Therefore, it is the principal object of the present invention to provide a method for optically measuring a distance by which very precise measuring is attained by eliminating the above mentioned inaccuracy in the triangulation method.

It is another object of the present invention to provide a method for optically measuring distances by which scanning measuring of the surface shape of an object is attained with precise accuracy.

It is a further object of the invention to provide a method for optically measuring thickness of an object, particularly, in a steel strip on line of rolling process in which measuring point scans across the strip to attain precise thickness scanning measurement.

These and other objects are attained with a method in which a rotating mirror having a plurality of mirror surfaces each of which has a different distance value of $d_1$ from other mirror surfaces is used for the latter practical method, and in which a pair of targets are provided in the beam axis to the light detector.

DETAILED DESCRIPTION OF THE INVENTION

Figure 1:
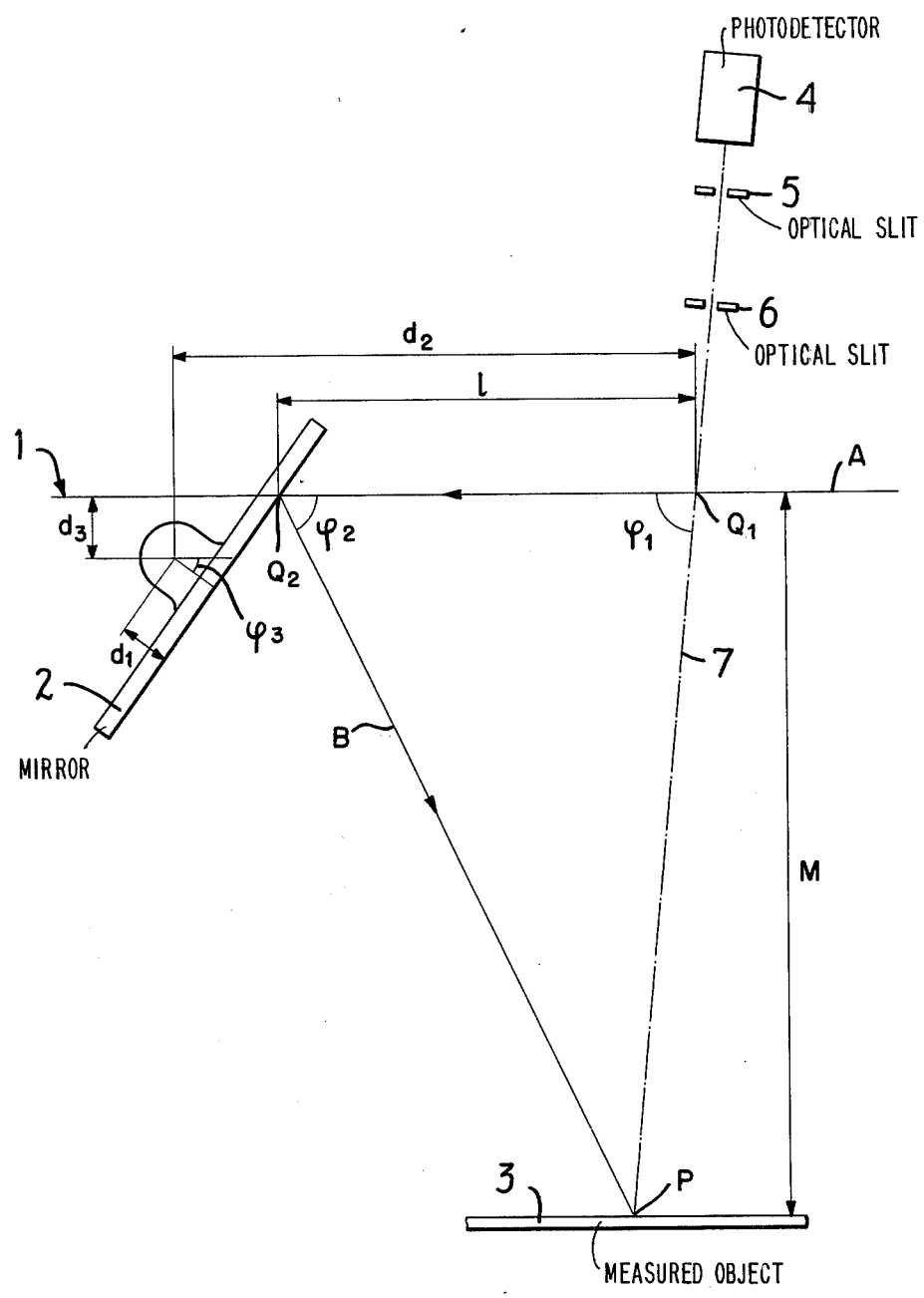
FIG. 1 is a schematic view showing a conventional triangular measurement theory for optically measuring a distance on an object.
Figure 2:
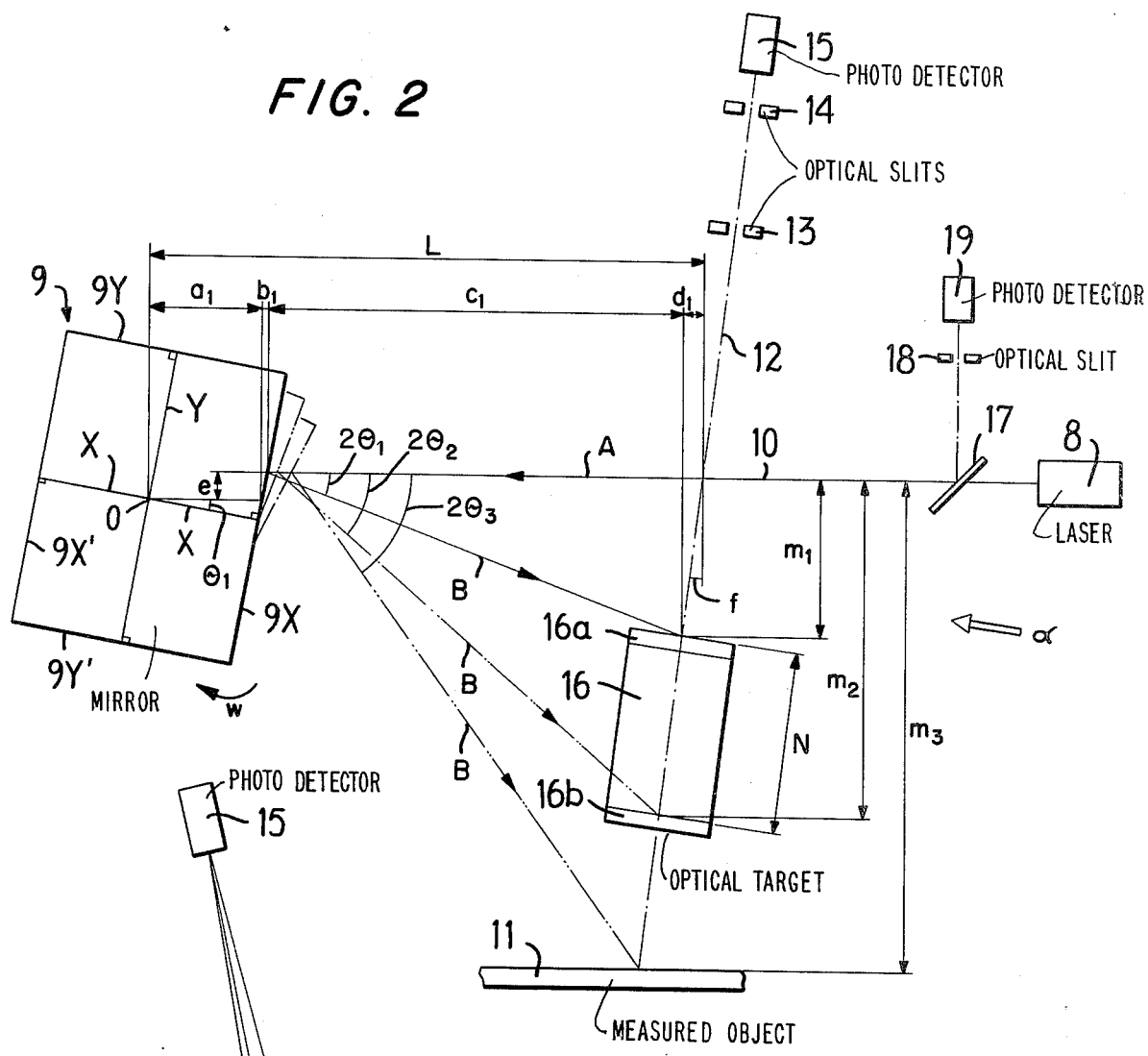
FIG. 2 is a schematic view showing an optical distance measurement theory according to this invention.

The method for optically measuring a distance according to this invention will now be described referring to FIG. 2, in which reference numeral 8 designates a laser tube.

Reference numeral 9 designates a rotating mirror which is facing in front of laser tube 8 and is provided with four mirror surfaces 9X, 9Y, 9X' and 9Y' formed in a symmetrical rectangular section about the axis thereof, the surfaces 9X and 9X' having distances X and the surfaces 9Y and 9Y' having distances Y from the axis O. Rotating mirror 9 is continuously driven in a constant speed by a driving mechanism which is not shown in the drawings. Laser beam A is irradiated to mirror 9 from laser tube 8. Laser beam A is used as the base line 10 for the distance, and the distance from base line 10 to the surface of an object 11 is to be measured.

Reference numeral 12 designates a detector optical axis determined by a set of slits 13 and 14 which are arranged perpendicular to base line 10. Reference numeral 15 designates a photo-detector, which detects a spot formed by reflected light beam B from rotating mirror 9 on object 11, at the crossing point or intersection of the object 11 and detector optical axis 12. Accordingly, the laser beam A from laser tube 8 is reflected by mirror surfaces 9X, 9Y, 9X' and 9Y' to sweep the surface of object 11 four times every one rotation of mirror 9. When the sweeping laser beam spot on object 11 reaches the crossing point of detecting optical axis 12, dispersed light from the spot is detected by photo-detector 15.

Figure 3:
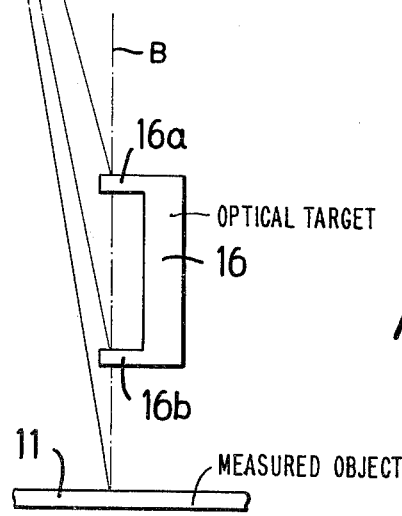
FIG. 3 is a schematic view showing spot detecting method in the detecting light beam axis.

Reference numeral 16 designates a U-shaped target intersecting detecting optical axis 12, a pair of upper and lower blades 16A and 16B being respectively arranged in a rectangular plane. Each of blades 16A and 16B also receives reflected light beam B and the spot of the beam in detection optical axis 12 on each blade is detected by the photo-detector. FIG. 3 is a side view seen from the direction of the arrow in FIG. 2, which illustrates that the detection optical axis 12 is located in a perpendicular plane to the sheet of FIG. 2.

Reference numeral 17 designates a half-mirror or beam splitter spaced in front of laser tube 8. Reference numeral 18 is a slit and numeral 19 is a photo-detector which detects the reflected light from mirror surface 9X, 9Y, ... of rotating mirror 9 through half-mirror 17 and slit 18 when mirror surface 9X, 9Y, 9X' or 9Y' takes the angular position perpendicular to the laser beam A during the mirror rotation.

Now, the computing method of the distance from base line 10 to the surface of object 11 will be described. In case of the duration when laser beam A is irradiated toward mirror surface 9X, reflected light beam B is at first detected by photo-detector 19, after which reflected light beam B rotates around till it reaches at upper blade 16a of target 16 where the spot is detected by photo-detector 15 along detecting optical axis 12. The time difference (t) between these two detections of photo-detectors 19 and 15 is just equal to the rotation time of mirror 9 from the angle where mirror surface 9X is perpendicular to laser beam A to the angle where reflected light beam B reaches at upper blade 16a of the target. Defining the angular velocity of rotating mirror 9 as $\omega$, the rotation angle $\theta_1$ is obtained from an equation $\theta_1 = \omega t$. The angle taken by the incident beam A and the reflected beam B which reaches at upper blade 16a and is detected by photo-detector 15 is equal to $2\theta_1$. Defining the distance between the rotary axis O of mirror 9 and base line 10 as e, the angular error of detector optical line 12 referring as base line 10 of f, and defining the distance between the crossing point of base line 10 and detecting optical axis 12 and the rotary axis O of mirror 9 to L, the distance L is obtained with distances $a_1$, $b_1$, $c_1$, $d_1$ and $m_1$ as follows, $$L = a_1 + b_1 + c_1 + d_1$$

As $a_1 = \chi \sec \theta_1$, $b_1 = e \tan \theta_1$, $c_1 = m_1 \cot 2\theta_1$ and $$d_1 = m_1 \tan f,$$

$$L = \chi \sec \theta_1 + e \tan \theta_1 + m_1 \cot 2\theta_1 + m_1 \tan f$$

Therefore, $$m_1 \cot 2\theta_1 + e \tan \theta_1 - L + m_1 \tan f = -\chi \sec \theta_1 \quad (1)$$

Next, the angle $\theta_2$ of mirror 9 where reflected light beam B reaches at lower blade 16b of the target, the angle $\theta_3$ where it reaches at the crossing point of object 11 and detector optical axis 12, and further, the angles $\theta_4$ and $\theta_5$ where reflected light beam from next mirror surface 9y reaches at upper and lower blades 16a and 16b of the target successively, are detected in the same way as that of angle $\theta_1$. Accordingly, the following equations are obtained, $$m_2 \cot 2\theta_2 + e \tan \theta_2 - L + m_2 \tan f = -\chi \sec \theta_2 \quad (2)$$

$$m_3 \cot 2\theta_3 + e \tan \theta_3 - L + m_3 \tan f = -\chi \sec \theta_3 \quad (3)$$

$$m_1 \cot 2\theta_4 - e \tan \theta_4 - L + m_1 \tan f = -\chi \sec \theta_4 \quad (4)$$

$$m_2 \cot 2\theta_5 + e \tan \theta_5 - L + m_2 \tan f = -\chi \sec \theta_5 \quad (5)$$

Further defining the distance from the upper blade to the lower blade of target 16 as N, the following equation is introduced, $$N = m_2 - m_1 \quad (6)$$

In these simultaneous equations (1) to (6), e, tan f, L, $m_1$, $m_2$ and $m_3$ are unknown but solvable, so that the distance $m_3$ can be computed from distances $\chi$, y and N, and rotation angle $\theta_1$, $\theta_2$, $\theta_3$, $\theta_4$ and $\theta_5$ which are all known. That is, the distance $m_3$ is never influenced by fluctuation parameters e, f, and L.

The above-mentioned distance $m_3$ is obtained from the reflections by mirror surfaces $9\chi$ and 9y.

It is possible to continuously measure distances between base line 10 and the object surface by a technique in which mirror 9 is continuously rotating, and photo-detector 15, detection optical axis 12 and target 16 are continuously moved along base line 10, and successively detecting rotation angles $\theta_n$ of the mirror surfaces of mirror 9 to compute distance $m_3$.

It is to be understood that, in the aforementioned embodiment, the rotary mirror is formed having a rectangular section for easy precise forming, but is exchangeable with a mirror having a different section which has more than two mirror surfaces. It is also to be understood that, for scanning measuring points, the rotary mirror travel along base line 10 with the detection optical axis will permit wider range measurement. It is further to be understood that the computing method of the distance $m_3$ is not limited to the aforementioned method, and the base line may be any line which can be set referring to the laser beam (e.g., a supposed line perpendicular to the laser beam).

An application of the aforementioned distance measuring method to a thickness gauge of steel strip on line of a cold-mill process results in higher precision measurement than that with X-ray.

Figure 4:
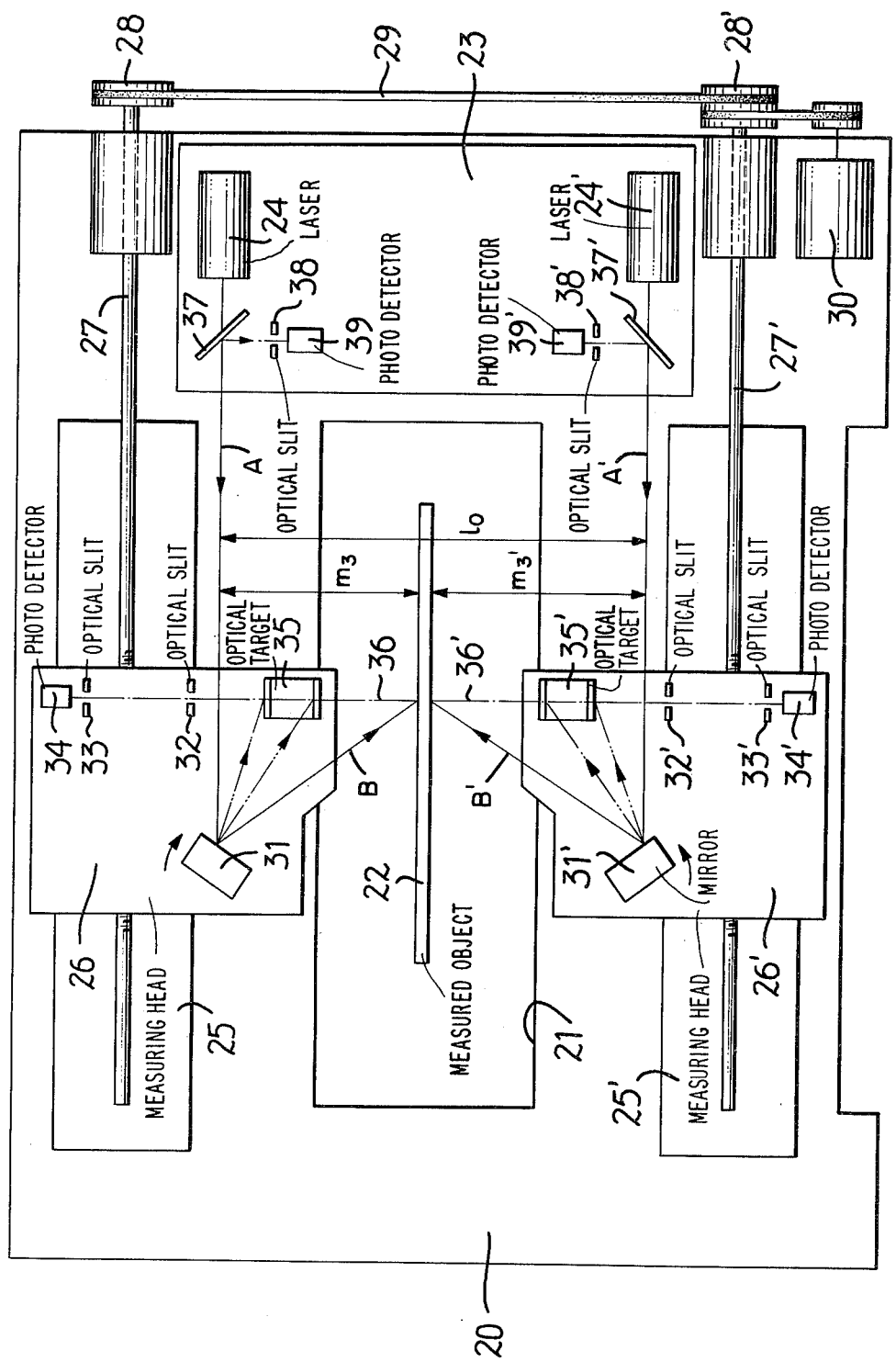
FIG. 4 is a schematic view showing a thickness measuring method according to this invention.

FIG. 4 shows an embodiment of the invention applied to measure the thickness of steel strip, in which reference numeral 20 designates an O-shaped frame, through the center opening 21 of which runs object or processed work (measured object) 22 in the perpendicular direction to the drawing sheet. Reference numeral 23 designates a base mounted on O-shaped frame 20 and reference numerals 24 and 24' designate a pair of laser tubes respectively fixed on base 23 and arranged so that laser beams A and A' irradiate therefrom on base axes in the logitudinal direction of O-shaped frame 20. Reference numerals 25 and 25' designate a pair of guides for slidably guiding measuring heads 26 and 26', said guides being fixed on frame 20 parallel to each other in the longitudinal direction of the frame. Reference numerals 27 and 27' are feeding shafts for synchronously feeding the measuring heads with the aid of timing pulleys 28 and 28' which are respectively fixed on ends of shaft 27 and 27' and a timing belt 29 which connects the pulleys 28 and 28' engaging round them. A servo-motor 30 is provided to drive both the feeding shaft 27 and 27' through the pulleys, whereby a pair of measuring heads 26 and 26' are synchronously fed in the longitudinal direction of frame 20, keeping their interfacing relation.

Reference numerals 31 and 31' designate rotary mirrors respectively provided on measuring heads 26 and 26' to interrupt the laser beams A and A'. Rotary mirrors 31 and 31' are rotated in a constant speed by driving motors (not shown) to sweep their reflected laser beam on processed work 22. Reference numerals 32, 33, 32' and 33' are slits on measuring heads 26 and 26', through which photo-detectors 34 and 34', which are also fixed on measuring heads 26 26', receive lights B and B' from spots of laser beams on processed work 22. Reference numerals 35 and 35' designate targets respectively fixed on measuring heads 26 and 26' intersecting detecting optical axes 36 and 36'. Reference numerals 37 and 37' designate half mirrors fixed on base 23 in front of laser tubes 24 and 24'. Reference numerals 38 and 38' designate slits mounted on base 23, and reference numerals 39 and 39' designate photo-detectors to detect laser beams through the slits, said beams being reflected at first by rotary mirrors 31 and 31' and then reflected by half mirrors 37 and 37'.

The process of the aforementioned thickness measuring method will be described hereinafter.

At first, detecting optical axes 36 and 36' are set at one side of processed work 22 by adjusting measuring heads 26 and 26'. Then measuring heads 26 and 26' are synchronously moved to the other side.

The operation of the aforementioned thickness measuring device will be described hereinafter.

After setting detecting optical axes 36 and 36', which are determined by slits 32, 33, 32' and 33', at one side (e.g., the right) of processed work 22, measuring heads 26 and 26' are synchronously moved to the other side (to the left) while mirrors 31 and 31' are rotating to sweep reflected laser beams on both the surfaces of processed work 22. Thus, distances $m_3$ and $m_3'$, which continously fluctuate, are sampled to be calculated according to the measuring principle of this invention, and the thickness of processed work 22 is attained subtracting $(m_3 + m_3')$ from the distance $l_0$ between laser beam A and A'.

It is to be noted that, in the above embodiment, rotary mirrors 31 and 31' are mounted on measuring heads 26 and 26' with photo-detectors 34 and 34' and targets 35 and 35', but the mirrors may be directly mounted on frame 20.

Figure 5:
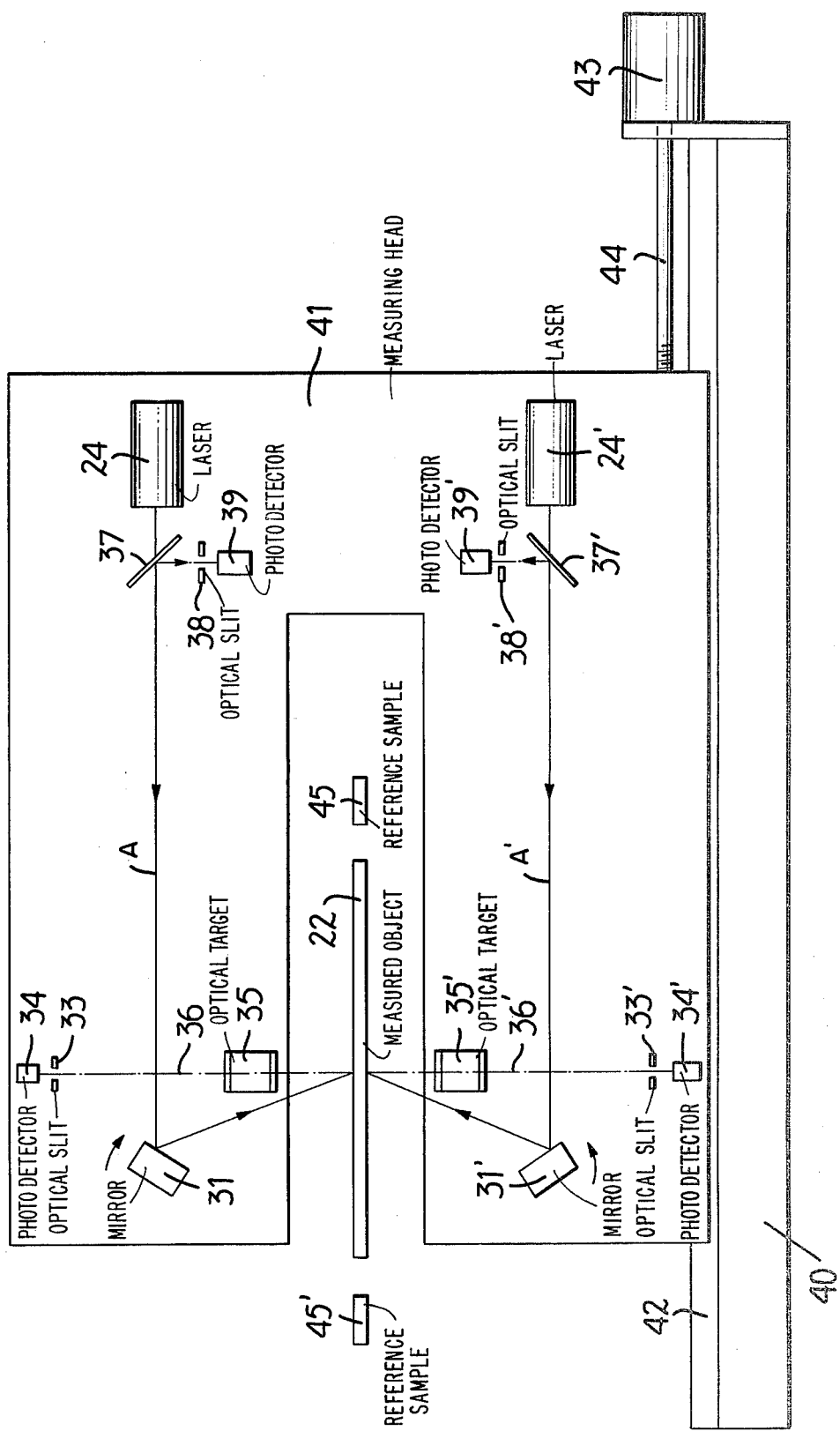
FIG. 5 is a schematic view showing another embodied thickness measuring method according to the invention.

Another embodiment of thickness measuring device according to this invention will be described referring to FIG. 5, in which reference numeral 40 designates a base frame and numeral 41 designates a C-shaped measuring head mounted slidable on the guide rail 42 of base frame 40. Measuring head 41 is to be driven by a servo-motor 43 by way of a feed screw 44 along the guide rail. A pair of laser tubes 24 and 24', rotary mirrors 31 and 31', photo-detector 34 and 34' and, etc., are symmetrically arranged on the single measuring head 41 similar to the first thickness measuring device, and a similar method is applied for this embodiment, in which single measuring head 41 is moved along for the scanning measuring point.

In these thickness measuring devices, it is preferable to provide reference samples 45 and 45' (in FIG. 5) adjacent to processed work 22 and to measure the reference sample thickness successively to work 22 for the comparative measurement, so that error in the measuring due to parallelism error of laser beams A and A' is eliminated.

What is claimed is:

1. A method of optically measuring the distance of an object from a reference line, comprising:
   (a) providing a polyhedral mirror and rotating the polyhedral mirror at a constant speed for rotation about an axis selected so that respective distances of faces of the mirror from the axis of rotation are different;
   (b) illuminating the polyhedral mirror with a beam of light stationary relative to the polyhedral mirror, wherein the beam of light defines a reference line for measuring a distance of an object relative thereto;
   (c) providing first detecting means for detecting light reflected from the polyhedral mirror when the polyhedral mirror is oriented so that the reflected light is reflected along the path of the incident beam of light, and detecting the reflected light with the first light detecting means;
   (d) providing second light detecting means having an optical axis for detecting light incident thereon in the direction of its optical axis;
   (e) providing a pair of light transmissive targets positioned along the optical axis of the second light detecting means and positioned for reflecting light reflected from the polyhedral mirror and incident on the light transmissive targets to the second light detecting means in the direction of its optical axis;
   (f) detecting light successively reflected from the pair of light transmissive targets as the polyhedral mirror rotates;
   (g) providing an object whose distance from the reference line is to be measured, and positioning the object on the optical axis of the second light detecting means with the pair of light transmissive targets between the object and the second light detecting means and with the object positioned to reflect light reflected from the polyhedral mirror and incident on the object to the second light detecting means in the direction of its optical axis;
   (h) detecting the light reflected from the object as the polyhedral mirror rotates; and
   (i) calculating the distance of the object from the reference axis from the times that reflected light is detected by the first and second light detecting means and the speed of rotation of the mirror.

2. A method for optically measuring a distance as claimed in claim 1, wherein the set of said pair of targets and said photo-detector is moved along said predetermined axis for scanning measurement.

3. A method for optically measuring a distance as claimed in claim 2, wherein further said polyhedral mirror is moved along said predetermined axis for longer scanning measurement.

4. A method of optically measuring the thickness of an object, comprising;
   (a) providing a pair of polyhedral mirrors on opposite sides of an object to be measured and rotating the polyhedral mirrors at a constant speed of rotation about respective axes selected so that respective distances of faces of the mirrors from the axes of rotation are different;
   (b) illuminating the polyhedral mirrors with respective beams of light stationary relative to the polyhedral mirrors, wherein the beams of light define respective reference lines on opposite sides of the object for measuring a distance of the object relative thereto;

(c) providing a pair of first detecting means each for detecting light reflected from a respective polyhedral mirror when the polyhedral mirror is oriented so that the reflected light is reflected along the path of the respective incident beam of light, and detecting the reflected light with the first light detecting means;

(d) providing a pair of second light detecting means each having an optical axis for detecting light incident thereon in the direction of its optical axis;

(e) providing two pair of light transmissive targets each positioned along the optical axis of a respective second light detecting means and each positioned for reflecting light reflected from a respective polyhedral mirror and incident on the light transmissive targets to the respective second light detecting means in the direction of its optical axis;

(f) detecting light successively reflected from the two pair of light transmissive targets as the polyhedral mirrors rotate;

(g) providing the object whose thickness is to be measured, and positioning the object on the optical axes of the respective second light detecting means with a pair of light transmissive targets between the object and each of the second light detecting means and with the object positioned to reflect light reflected from the polyhedral mirrors and incident on the object to the respective second light detecting means in the direction of the respective optical axes;

(h) detecting the light reflected from the object as the polyhedral mirrors rotate; and (i) calculating the thickness of the object from the times that reflected light is detected by the pair of first and pair of second light detecting means and the speed of rotation of the mirrors.

5. A method for optically measuring a thickness of an object as claimed in claim 4, wherein the pair set of said polyhedral mirrors, said targets and said photo-detectors are moved together along the object surfaces for scanning measurement.

* * * * *